US005853274A

United States Patent [19]

Coffey et al.

[11] Patent Number: 5,853,274

[45] Date of Patent: Dec. 29, 1998

[54] VERTICAL ADJUSTMENT MECHANISM FOR FIXED-BASE ROUTER

[75] Inventors: John R. Coffey; Lawrence M. Cotton, both of New Bern; Miles Shorey, IV, Oriental, all of N.C.; Carl Christan Carlson, Vernon Hills, Ill.

[73] Assignee: S-B Power Tool Company, Chicago, Ill.

[21] Appl. No.: 963,918

[22] Filed: Nov. 4, 1997

[51] Int. Cl.[6] .......... B23C 1/20

[52] U.S. Cl. .......... 409/182; 144/136.95; 144/154.5; 408/241 S; 409/206; 409/218

[58] Field of Search .......... 409/182, 181, 409/180, 210, 206, 218; 144/136.95, 154, 371; 408/241 S, 202, 110

[56] References Cited

U.S. PATENT DOCUMENTS

| | | | |
|---|---|---|---|
| 4,319,860 | 3/1982 | Beares | 409/182 |
| 4,770,573 | 9/1988 | Monobe | 409/182 |
| 4,938,642 | 7/1990 | Imahashi et al. | 409/182 |
| 5,074,724 | 12/1991 | McCracken | 409/182 |
| 5,088,865 | 2/1992 | Beth et al. | 409/204 |
| 5,094,575 | 3/1992 | Kieser et al. | 409/182 |
| 5,117,879 | 6/1992 | Payne | 409/182 |
| 5,139,061 | 8/1992 | Neilson | 409/182 |
| 5,143,494 | 9/1992 | McCurry | 409/182 |
| 5,286,147 | 2/1994 | Escobedo et al. | 409/218 |

*Primary Examiner*—Daniel W. Howell
*Assistant Examiner*—Adesh Bhargava
*Attorney, Agent, or Firm*—Jones, Day, Reavis & Pogue

[57] ABSTRACT

The fixed-base router has an annular base member supporting a cylindrical base member. A cylindrical motor housing is telescopingly received within the cylindrical base member; the motor housing includes three vertically aligned notches. A vertically disposed rod is rotatably mounted by the cylindrical base member. The rod includes an external threaded area in threading engagement with a threaded bore in a lever. The lever includes a latch for engagement with a selected one of the notches for coarse vertical adjustment. Fine vertical adjustment is obtained by rotating the rod with the latch in engagement with one of the notches.

11 Claims, 4 Drawing Sheets

VERTICAL ADJUSTMENT MECHANISM FOR FIXED-BASE ROUTER

BACKGROUND OF THE INVENTION

The present invention relates to routers. More particularly, the present invention relates to a vertical adjustment mechanism for a fixed-base router permitting both coarse and fine vertical adjustments.

There are basically two types of routers: fixed-base and plunge. A fixed-base router, also known as a standard router, has a base that clamps directly to a removable motor making the router one integral or "fixed" unit.

Virtually all fixed-base routers have mechanisms to clamp the motor in the router's base at a designated vertical position. To effect the desired depth of cut (the amount of bit projecting through the sub-base), the operator must move the router motor up and down and then clamp the motor to the base. In most router applications it is necessary to set the depth of cut accurately and precisely. There are three basic ways in which the motor may be vertically positioned relative to the base: (1) an adjustable ring-and-slide system; (2) a screw-in or spiral system; and (3) a rack-and-pinion system.

Representative prior art includes: U.S. Pat. Nos. 1,899,883; 3,811,361; 4,770,573; and 5,273,089. The prior art also includes routers on the market, such as the Porter Cable model 690, the Bosch model 1604A and the Dewalt (Black & Decker) model DW 610.

SUMMARY AND OBJECTS OF THE PRESENT INVENTION

The invention may be summarized as a new and improved vertical adjustment mechanism for a fixed-base router providing both coarse and fine adjustment.

A primary object of the present invention is the provision of a fixed-base router having a vertical adjustment mechanism permitting both coarse and fine vertical movement of the motor housing relative to the base assembly.

Another object of the present invention is the provision of such a vertical adjustment mechanism which is reliable in operation and which permits accurate and precise positioning of the motor housing (and consequentially the bit) relative to the base assembly.

Still another object of the present invention is the provision of a vertical adjustment mechanism for a fixed-base router which is of uncomplicated construction thereby lending itself to low-cost manufacture and reliable operation.

These and other objects and advantages of the invention will become apparent from the following specification.

DESCRIPTION OF A PREFERRED EMBODIMENT

Figure 1:
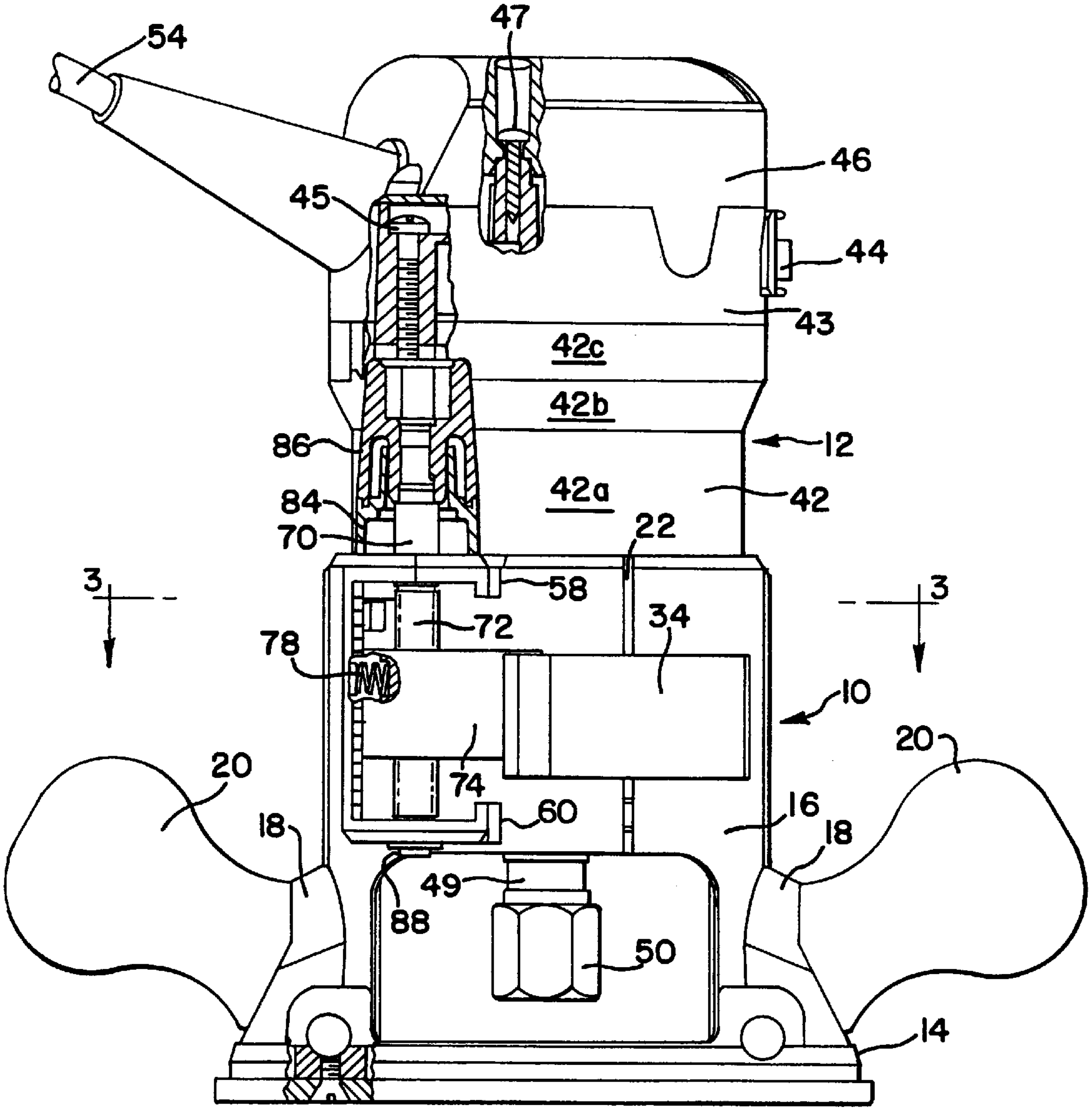
FIG. 1 is a front elevational view of a fixed-base router incorporating the present invention.
Figure 2:
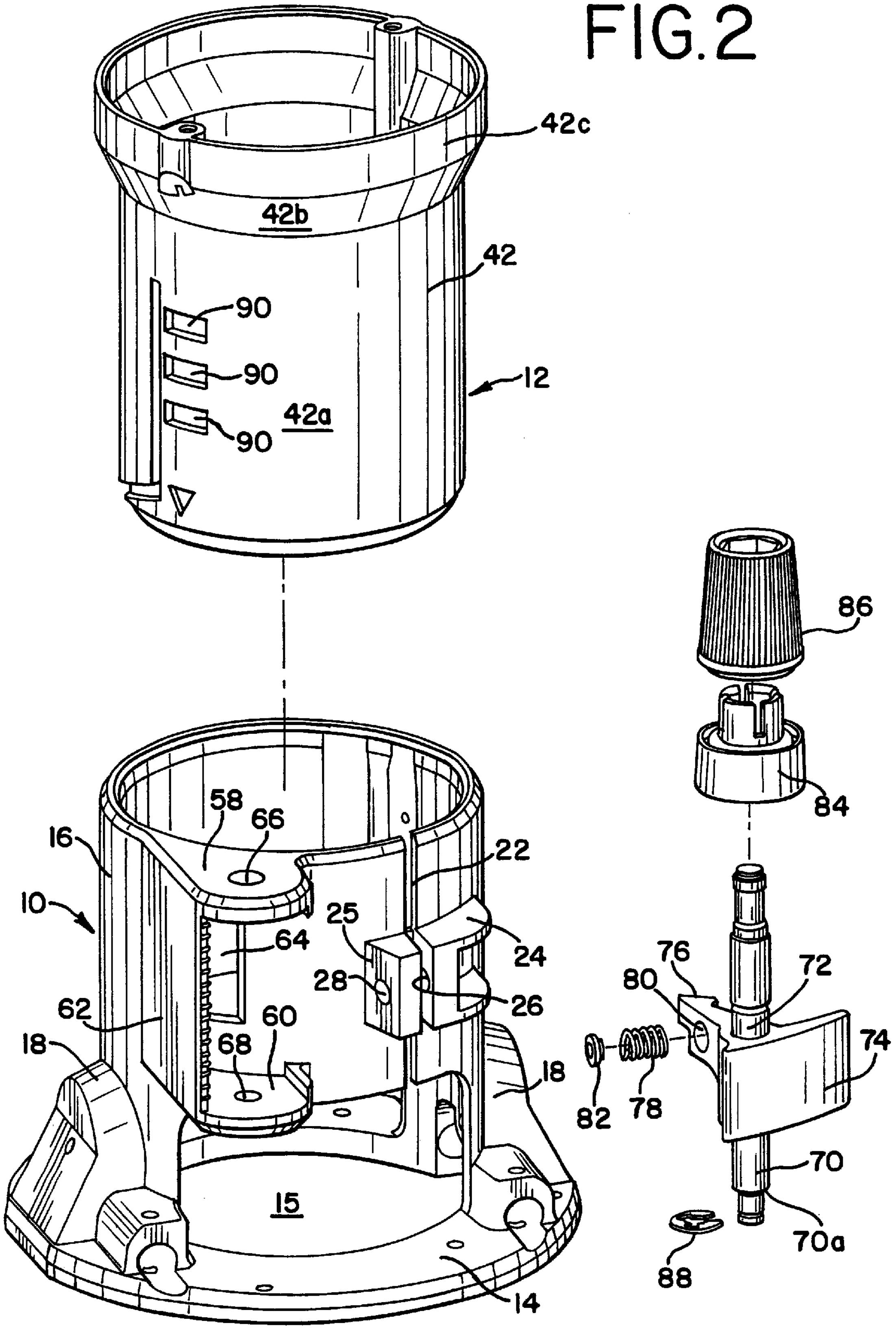
FIG. 2 is an exploded isometric view of the router shown in FIG. 1 (with the motor itself not being shown)

Referring primarily to FIGS. 1 and 2, a router embodying the present invention includes a base assembly, generally designated 10, and a motor assembly, generally designated 12. The base assembly 10 includes a generally annular base member 14 having an opening 15. The base assembly includes a cylindrical base member 16 supported by the annular base member 14. The cylindrical base member 16 includes diametrically disposed formations 18 supporting the usual handles 20 (the handles are shown only in FIG. 1).

Figure 3:
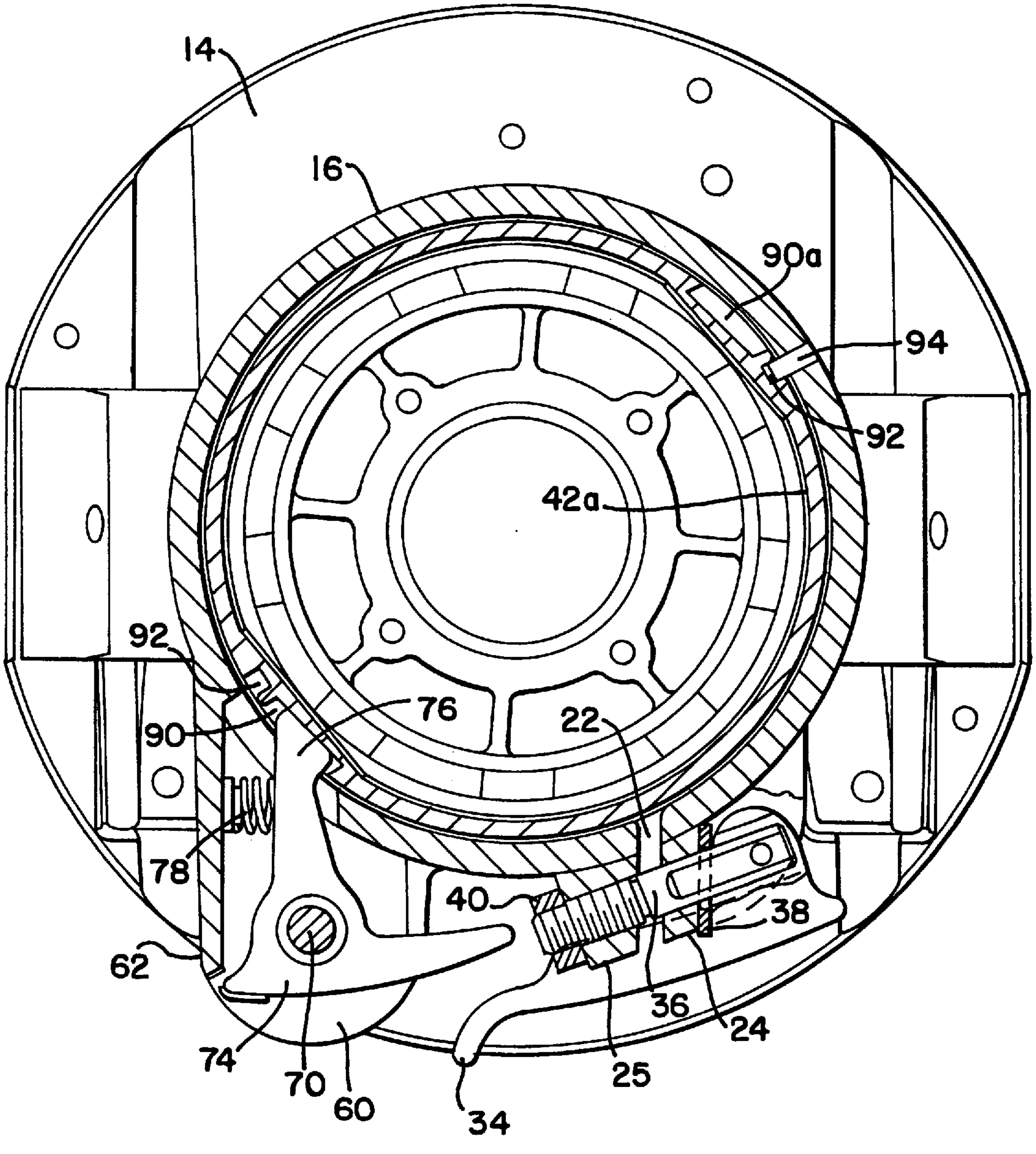
FIG. 3 is a section taken along the line 3—3 of FIG. 1.
Figure 4:
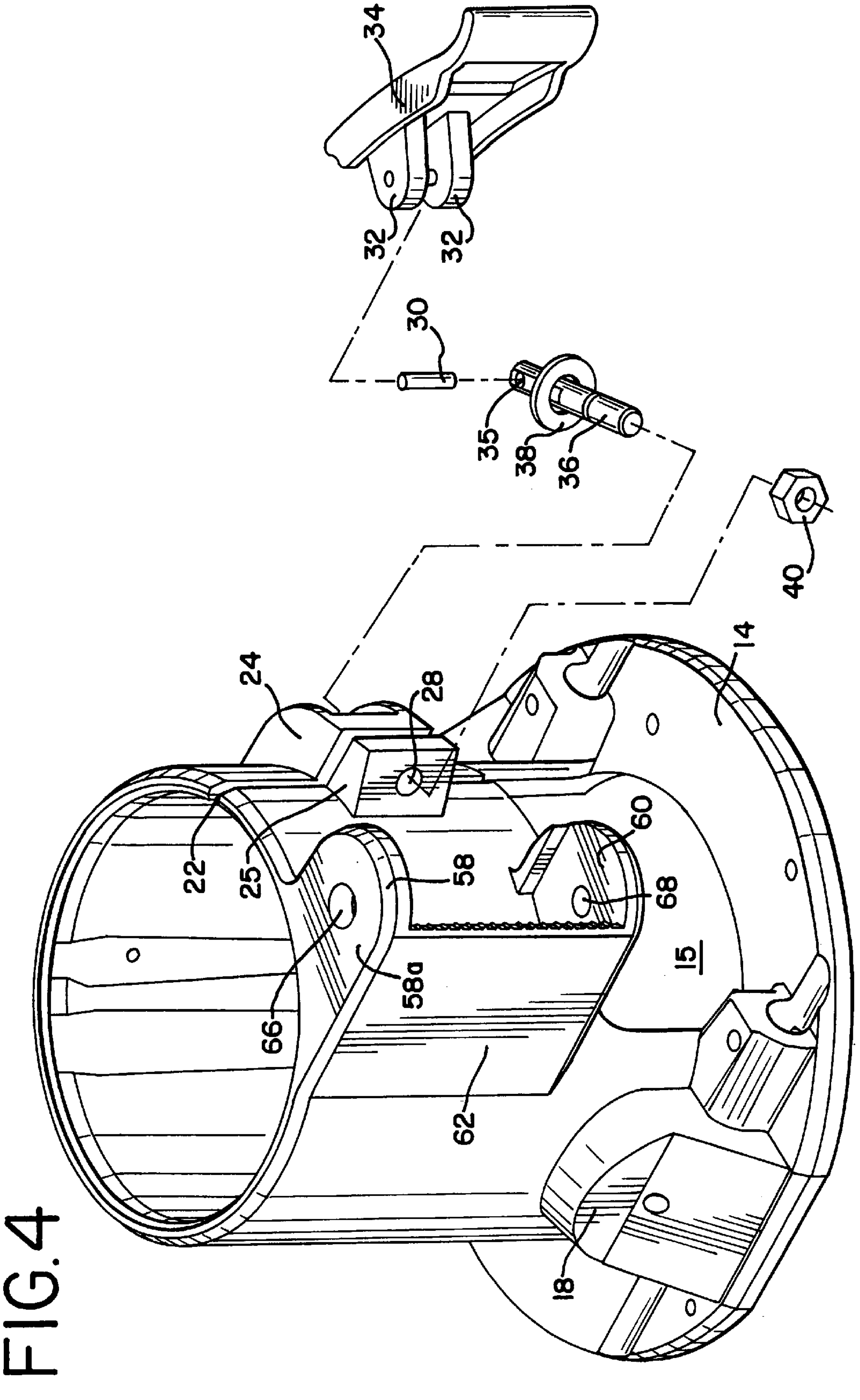
FIG. 4 is an enlarged, exploded isometric view of the base assembly.

The cylindrical base member 16 has an axial or longitudinally extending slot 22. Adjacent this slot, the cylindrical member 16 mounts clamp support members 24 and 25 having respective aligned bores 26 and 28. A pin 30 is captured between ears 32 integral with an over-center clamp 34. The pin 30 is received within an aperture 35 formed in one end of an adjusting screw 36. The screw 36 is adapted to receive a washer 38 and a nut 40. The adjusting screw 36 is received within the bores 26 and 28 of the support members 24 and 25 as best seen in FIG. 3. It is apparent that the clamp lever 34 may be actuated for squeezing the cylindrical base member 16 into snug engagement with the motor assembly 12. Also, the lever 34 may be released to permit easy movement of the motor assembly in the base assembly. The engagement between the cylindrical base member and the cylindrical motor assembly is preferably of the type shown and claimed in application, Ser. No. 08/963,917, filed Nov. 4, 1997, attorney docket 950802, entitled "Fixed-Base Router With V-Block Mounting" and assigned to the assignee of the present application.

The motor assembly 12 includes a hollow motor housing 42 having a cylindrical portion **42*a* joining with a frusto-conical portion 42*b* which in turn joins with an enlarged, concentric annular formation 42*c*. The motor assembly 12 also includes a cylindrical part 43 mounting a rocker switch 44. The part 43 is connected to the part 42 by suitable fasteners (one such fastener is shown in FIG. 1 and designated 45). Also, the motor assembly 12 includes a cover 46. The cover is detachably connected to the part 43 by a plurality of fasteners (one such fastener is illustrated and designated 47). The motor housing 42 is adapted to receive an electric motor (not shown) having an output shaft 49 mounting a collet 50. It will be understood that the collet 50 is adapted to mount a suitable router bit (not shown) which projects through the opening 15 of the base member 14 for engagement with the work. The motor is preferably electric and includes the usual cord 54. The motor is actuated by the rocker switch 44**. Other types of motors may be provided, such as a pneumatic motor.

The cylinder 16 of the base assembly 10 includes integral opposed lugs 58 and 60 joined by a wall 62 adjacent a rectangular aperture 64 (FIG. 2) formed in the cylinder 16. Lugs 58 and 60 include respective apertures 66 and 68 rotatably receiving opposite ends of a vertical adjustment rod 70. The rod 70 includes an external threaded formation 72 received within a threaded bore formed in an adjustment lever 74. The lever 74 includes an integral latch formation 76. Spring 78 has one end thereof received within a blind bore 80 formed in the lever 74. The other end of the spring 78 engages a shoulder washer 82 which abuts the inside surface of the wall 62 thereby biasing the latch 76 to extend through the aperture 64.

The rod 70 mounts an indicator ring 84 and a knob 86. The knob 86 and indicator ring 84 are mounted to the rod 70 for rotation therewith. The indicator ring 84 and the upper surface **58*a* of the lug 58 may be provided with suitable indicia in the nature of a scale to indicate the rotary position of the rod 70. The rod 70 is maintained in the apertures 66 and 68 by a snap-ring 88 and an annular shoulder 70*a* formed on the rod; the snap-ring and the annular shoulder engage opposite faces of the lug 60. It will be apparent that rotation of the rod 70, by actuation of the knob 86, will cause vertical movement of the adjustment lever 74 upwardly or downwardly depending on the direction of rotation of the rod 70 by reason of the threaded connection between the rod 70 and the lever. Further, this threaded engagement also serves to mount the adjustment lever 74** for rotation or pivoting in a horizontal plane.

As best seen in FIG. 2, the cylindrical portion 42*a* of the motor housing 42 includes three vertically aligned positioning notches 90. Each notch 90 is adapted to receive the latch 76 of the adjustment lever 74. While three vertically aligned positioning notches have been shown, any desired number of such vertically aligned notches or formations may be provided. The notches may be in the form of recesses in the cylinder 42*a* or in the form of openings through the cylinder portion 42*a*. Preferably, the cylinder 42*a* is provided with three additional vertically aligned notches 90*a* (FIG. 3) diametrically oppositely disposed to the notches 90. Thus, the motor assembly 12 may be received within the base assembly in either of two rotary positions for right-hand or left-hand operation. In this regard, the rocker switch 44 may be located at either the left-side or right-side of the router. As seen in FIG. 3, the cylinder 42*a* is provided with two diametrically oppositely disposed, external recesses 92 each adapted to receive an alignment pin 94 mounted in the base cylinder 16. Engagement of one of the recesses 92 with the pin 94 will ensure that the notches 90 or 90*a* are in rotary alignment with the latch 76.

To adjust the motor and motor housing to the desired vertical position, the operator will release the over-center clamp 34 and slide the motor assembly 12 vertically to position a selected notch 90 or 90*a* in horizontal alignment with the latch 76 of the adjustment lever 74. The adjustment lever will be held by the operator in its disengaged position during this operation. Release of the adjustment lever 74 will permit the spring 78 to pivot the lever 74 about the rod 70 to force the latch 76 into the selected notch 90 or 90*a*. Engagement of the latch 76 with one of the selected notches provides a coarse vertical adjustment. After the latch 76 has been engaged with the selected notch 90 or 90*a*, the operator will rotate the knob 86 and thus the rod 70 in one direction or the other to move the adjustment lever 74 vertically upwardly or downwardly depending on the direction of rotation of the rod 70. This movement of the adjustment lever will cause corresponding movement of the motor assembly 12 for establishing fine vertical adjustment of the motor and motor housing. After the desired vertical position has been achieved by operation of the knob 86, the clamp 34 will be actuated to secure the motor assembly 12 to the base assembly 10.

While a preferred embodiment has been shown, the invention is not to be limited to the preferred embodiment. The invention is susceptible to various changes and modifications coming within the scope of the following claims.

We claim:

1. A router comprising:

(a) a base assembly including an annular base member supporting an upright cylindrical base member;

(b) a cylindrical motor housing telescopingly and slidably received within said cylindrical base member, said motor housing having a plurality of vertically aligned, spaced first formations;

(c) a vertical adjustment mechanism supported by said base assembly, said adjustment mechanism including a lever and an adjustment means for moving the lever vertically with respect to the base assembly, said lever having a second formation and being mounted for movement back and forth between (i) a first position wherein said second formation is in engagement with a selected one of said first formations to prevent vertical sliding movement of the motor housing relative to the lever and (ii) a second position wherein said second formation is disengaged from said first formations thereby permitting vertical sliding movement of said motor housing relative to said lever.

2. The router according to claim 1 wherein said adjustment means includes a vertically disposed rod having an external threaded formation and a threaded bore in said lever, said rod being mounted for rotation and having its threaded formation in threading engagement with said threaded bore.

3. The router according to claim 1 wherein said first formations are defined by notches in said motor housing.

4. The router according to claim 2 wherein said first formations are defined by notches in said motor housing.

5. The router according to claim 2 wherein said second formation is in the form of a latching element, and wherein biasing means are provided for urging said element into engagement with a selected one of said first formations.

6. The router according to claim 1 wherein said cylindrical base member includes an opening for receiving said second formation.

7. The router according to claim 2 further including indicia means for determining the amount of rotary movement of said rod.

8. A router comprising:

(a) a base assembly including an annular base member supporting an upright cylindrical base member;

(b) a cylindrical motor housing telescopingly and slidably received within said cylindrical base member, said motor housing having a plurality of vertically aligned, spaced first formations;

(c) a vertical adjustment mechanism supported by said base assembly, said adjustment mechanism including a vertically disposed rod mounted for movement about its longitudinal central axis, said rod including an external threaded area, said adjustment means also including a lever having a threaded bore in threading engagement with the threaded area of said rod, whereby rotation of said rod serves to move said lever vertically, said lever having a second formation and being movable back and forth between (i) a first position wherein said second formation is in engagement with a selected one of said first formations to prevent vertical sliding movement of the motor housing relative to the lever and (ii) a second position wherein said second formation is disengaged from said first formations thereby permitting vertical sliding movement of said motor housing relative to said lever.

9. The router according to claim 8 wherein said adjustment means includes spring means for urging said second formation into engagement with a selected one of said first formations.

10. The router according to claim 8 wherein said back and forth movement of the lever is permitted by the threaded engagement between said lever and said rod.

11. The router according to claim 9 wherein said first formations are defined by notches formed in said motor housing.

* * * * *